United States Patent
Yang

(10) Patent No.: US 12,141,475 B2
(45) Date of Patent: Nov. 12, 2024

(54) STORAGE DEVICE CAPABLE OF DYNAMICALLY DETERMINING WHETHER TO AND WHEN TO SEND NEXT INTERRUPT EVENT TO HOST DEVICE

(71) Applicant: Silicon Motion, Inc., Hsinchu County (TW)

(72) Inventor: Tzu-Yi Yang, Hsinchu County (TW)

(73) Assignee: Silicon Motion, Inc., Hsinchu County (TW)

(*) Notice: Subject to any disclaimer, the term of this patent is extended or adjusted under 35 U.S.C. 154(b) by 0 days.

(21) Appl. No.: 17/743,485

(22) Filed: May 13, 2022

(65) Prior Publication Data
US 2023/0367513 A1    Nov. 16, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
USPC ....................................................... 711/103
See application file for complete search history.

(56) References Cited

U.S. PATENT DOCUMENTS

| | | | |
|---|---|---|---|
| 8,554,968 B1 | 10/2013 | Onufryk | |
| 2018/0275872 A1* | 9/2018 | Benisty | .................. G06F 13/24 |
| 2021/0279186 A1* | 9/2021 | Kunt | .................. G06F 13/1668 |
| 2022/0050629 A1* | 2/2022 | Vlasov | .................. G06F 3/0656 |
| 2023/0101626 A1* | 3/2023 | Hahn | .................. G06F 3/0679 |
| | | | 711/154 |

FOREIGN PATENT DOCUMENTS

| | | |
|---|---|---|
| CN | 112506568 A | 3/2021 |
| TW | I530793 B | 4/2016 |

* cited by examiner

*Primary Examiner* — Arpan P. Savla
*Assistant Examiner* — Sidney Li
(74) *Attorney, Agent, or Firm* — Winston Hsu

(57) ABSTRACT

A method of a storage device to be externally coupled to a host device via a specific communication interface includes: providing a flash memory unit comprising at least one flash memory; counting an outstanding command number for at least one submission queue which is used for storing information of unfinished commands; counting a completion command number for at least one completion queue which is used for storing information of finished commands; and, generating and outputting an interrupt event from the storage device to the host device when a comparison result of the counted outstanding command number with the counted completion command number matches a specific condition.

12 Claims, 7 Drawing Sheets

STORAGE DEVICE CAPABLE OF DYNAMICALLY DETERMINING WHETHER TO AND WHEN TO SEND NEXT INTERRUPT EVENT TO HOST DEVICE

BACKGROUND OF THE INVENTION

1. Field of the Invention

The invention relates to a flash memory scheme, and more particularly to a storage device, a flash memory controller, and a corresponding method.

2. Description of the Prior Art

Generally speaking, a conventional flash memory storage device is arranged to send an interrupt event to a host device that is externally coupled to the conventional flash memory storage device each time when the conventional flash memory storage device completes or finished an unfinished command that is generated by the host device. Inevitably, the host device will be frequently interrupted by the conventional flash memory storage device, and the whole throughput or performance will be degraded due to this.

SUMMARY OF THE INVENTION

Therefore one of the objectives of the invention is to provide a storage device, a flash memory controller, and a corresponding method, to solve the above-mentioned problems.

According to embodiments, a flash memory controller of a storage device, to be externally coupled to a host device via a specific communication interface, is disclosed. The flash memory controller comprises a register unit and a processor. The processor is coupled to the register unit, and is used for counting an outstanding command number for at least one submission queue which is used for storing information of unfinished commands, counting a completion command number for at least one completion queue which is used for storing information of finished commands, and for generating and outputting an interrupt event from the storage device to the host device when a comparison result of the counted outstanding command number with the counted completion command number matches a specific condition.

According to the embodiments, a storage device, to be externally coupled to a host device via a specific communication interface, is disclosed. The storage device comprises a flash memory unit and a flash memory controller. The flash memory unit comprises at least one flash memory. The flash memory controller is coupled to the flash memory unit, and is used for counting an outstanding command number for at least one submission queue which is used for storing information of unfinished commands, counting a completion command number for at least one completion queue which is used for storing information of finished commands, and for generating and outputting an interrupt event from the storage device to the host device when a comparison result of the counted outstanding command number with the counted completion command number matches a specific condition.

According to the embodiments, a method of a storage device to be externally coupled to a host device via a specific communication interface is disclosed. The method comprises: providing a flash memory unit comprising at least one flash memory; counting an outstanding command number for at least one submission queue which is used for storing information of unfinished commands; counting a completion command number for at least one completion queue which is used for storing information of finished commands; and, generating and outputting an interrupt event from the storage device to the host device when a comparison result of the counted outstanding command number with the counted completion command number matches a specific condition.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution and a novel interrupt coalescing method for dynamically determining whether to and when to generate one or more interrupt events/signals from a storage device to a host device in response to both of the condition of the host device generating command(s) and the condition of the storage device executing/finishing command(s). This equivalently makes the time interval between two consecutive interrupt events be adjustable or variable based on the conditions of the host device and the storage device.

Figure 1:
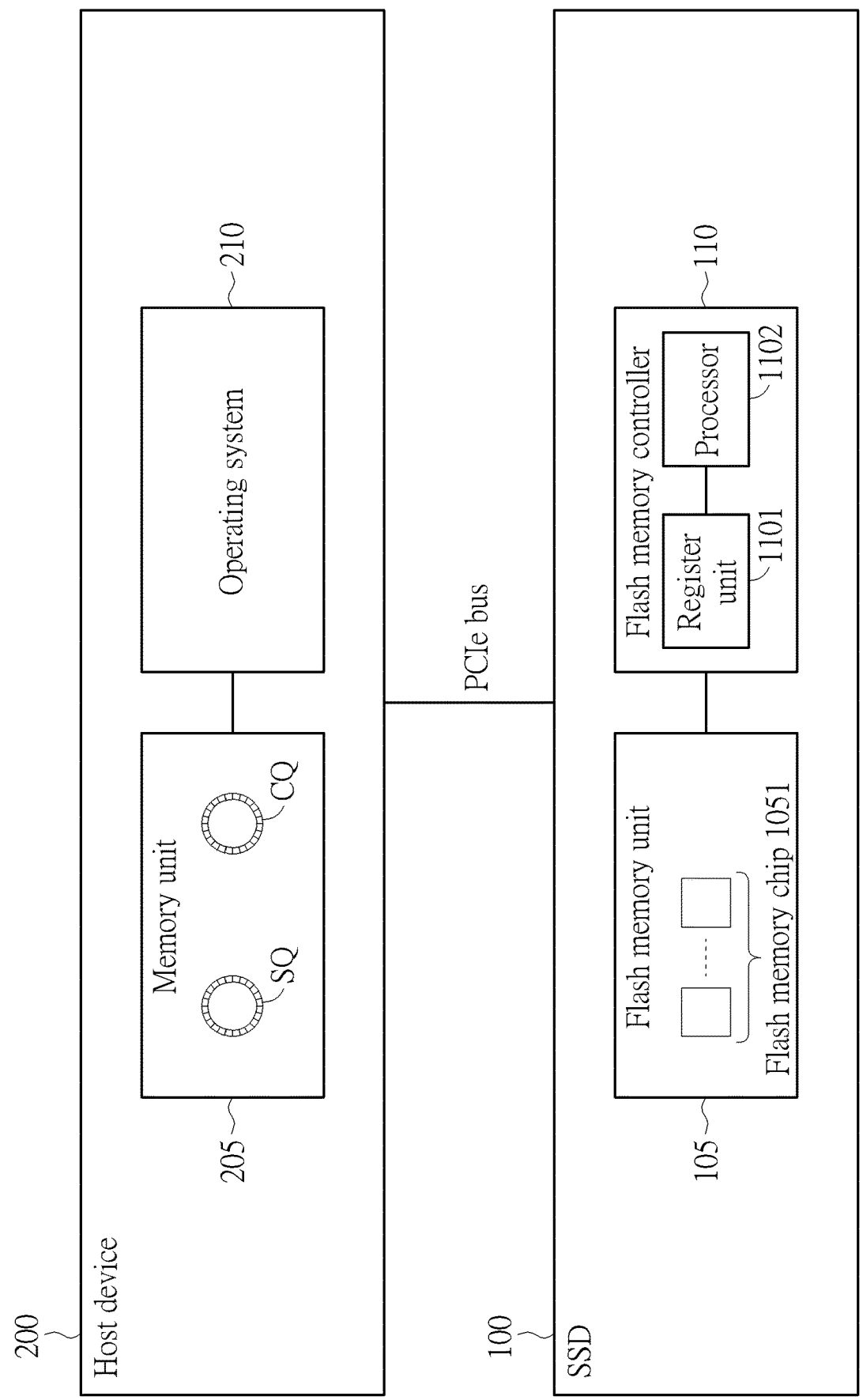
FIG. 1 is a diagram showing an example of a command execution flow for a storage device such as a solid-state drive/device (SSD) according to an embodiment of the invention.

FIG. 1 is a block diagram of a storage device such as a solid-state drive/device (SSD) 100 externally coupled to a host such as a host device 200 via a specific communication interface according to an embodiment of the invention. In FIG. 1, the SSD 100 may comprise and may be implemented by one or more flash memories, and it conforms to the interface specification of Non-Volatile Memory Express (NVMe) or Non-Volatile Memory Host Controller Interface Specification (NVMHCIS). The specific communication interface for example is a Peripheral Component Interconnect Express (PCIe or PCI-E) bus, and the SSD 100 comprises a flash memory unit 105 and a flash memory controller 110. The flash memory unit 105 may be a flash memory module comprising one or more flash memory chip dies 1051 (i.e. the above-mentioned flash memories). The flash memory controller 110 comprises a register unit 1101 which comprise one or more doorbell registers and a processor 1102 which is externally coupled to the register unit 1101; alternatively, in other embodiment, the doorbell register(s) may be disposed in the flash memory unit 105.

The host device 200 comprises a memory unit 205 and an operating system 210 coupled to the memory unit 205, and in this embodiment the memory unit 205 comprises at least one submission queue (SQ) and at least one completion queue (CQ) as shown in FIG. 1. The SQ and CQ are implemented by circular queues (or ring buffers). A circular queue is a buffer as if it is connected end-to-end, i.e. its tail is connected to its head. The SQ comprises multiple entries, i.e. SQ entries, and the CQ comprises multiple entries, i.e. CQ entries. An entry is used for storing information of one command, e.g. command's unique information such as identification (ID) information.

Figure 2:
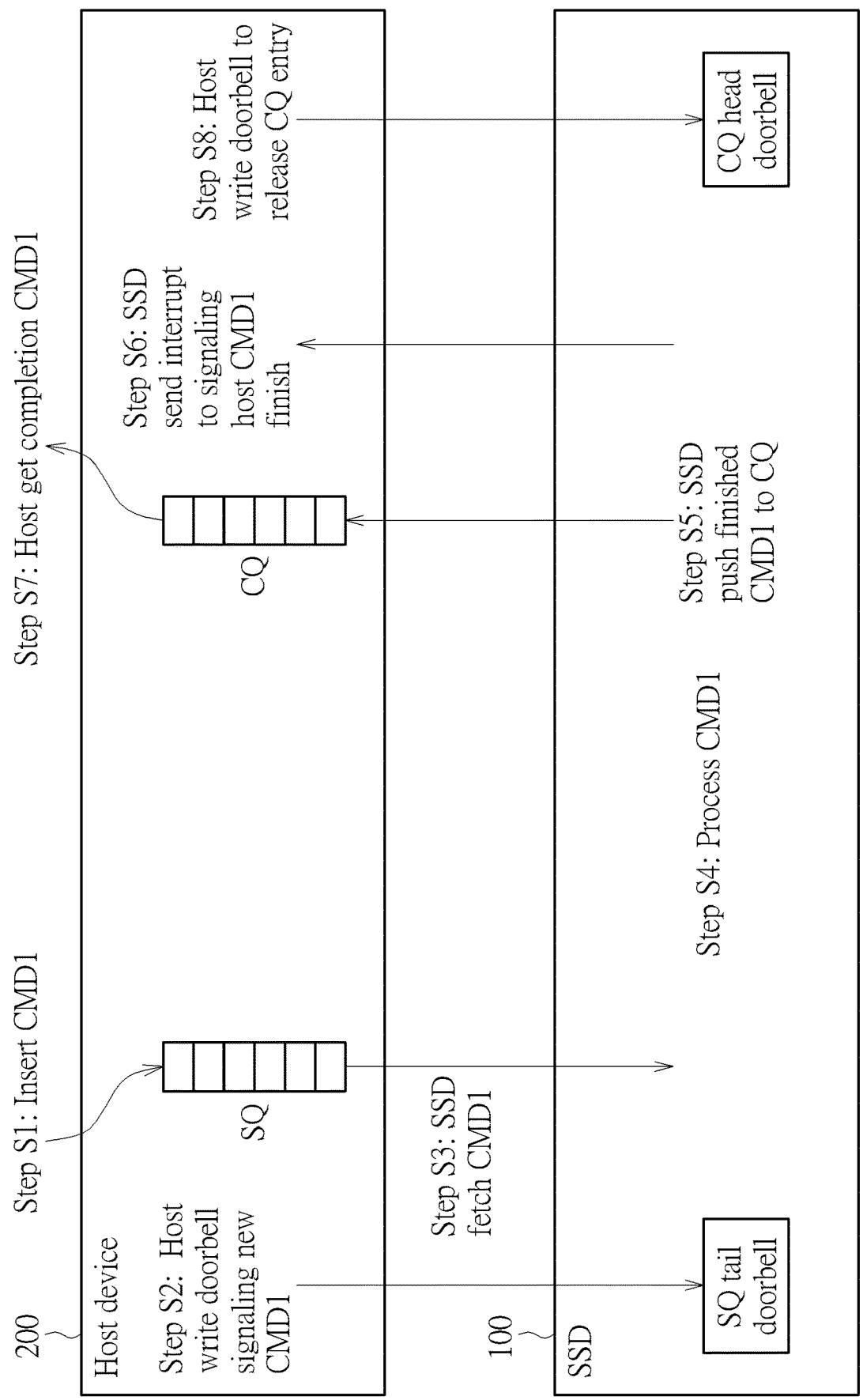
FIG. 2 is a diagram showing an example of a command execution flow such as NVMe command execution flow in a default mode for the SSD in FIG. 1 according to an embodiment of the invention.

The SSD 100 may comprise a default mode and a specific processing mode in which the operations of whether to and when to generate interrupt event(s) are different from those of the default mode. FIG. 2 is a diagram showing an example of a command execution flow such as NVMe command execution flow (but not limited) in the default mode for the SSD 100 in FIG. 1 according to an embodiment of the invention. The host device 200 (or operating system 210) is arranged to generate and output commands such as read, write, program, trim, and/or erase command(s), and the flash memory controller 110 (or processor 1102) of the SSD 100 is arranged to fetch the command(s) and perform corresponding processing operation(s) upon the flash memory unit 105 in response to the received/fetched command(s) respectively. The flash memory controller 110 (or processor 1102) of SSD 100 is arranged to generate an interrupt signal/event to the host device 200 when the flash memory controller 110 (or processor 1102) determines that a portion of commands have been finished, wherein in this embodiment the number of the portion of finished commands can be dynamically adjusted or changed based on the condition of the host device 200 and the condition of the SSD 100.

For instance, for the command execution flow as shown in FIG. 2, in a first step S1, the host device 200 (or operating system 210) for example generates a specific command CMD1 and then inserts specific information such as unique ID information of the specific command CMD1 into the SQ comprised by the memory unit 205. For example, ID information of the specific command CMD1 is inserted into and buffered in an empty SQ entry of the SQ.

In a second step S2 of the command execution flow, the host device 200 (or operating system 210) is arranged to update an SQ tail pointer which is used to indicate the tail information of the command(s) in the SQ, i.e. which entry the tail of unfinished command(s) is at. For example, if the command CMD1 is inserted into the n-th entry of the SQ, the SQ tail pointer after being updated is arranged to indicate the n-th entry of the SQ is the tail of unfinished command(s) in the SQ. For example (but not limited), the SQ tail pointer can be implemented by using an SQ tail doorbell register that is disposed in and comprised by the register unit 1101 of the SSD 100. The host device 200 (or operating system 210) in this situation for example writes the information of the n-th entry into the SQ tail doorbell register of the register unit 1101 via the PCIe bus to update the value previously recorded by the SQ tail doorbell register. Thus, the flash memory controller 110 (or processor 1102) of SSD 100 can obtain the value recorded in the SQ tail doorbell register to know the tail information of command(s) buffered in the SQ of host device 200.

In a third step S3 of the command execution flow, based on the value currently recorded in the SQ tail doorbell register of the register unit 1101, the flash memory controller 110 (or processor 1102) of SSD 100 fetches ID information of one command buffered in the SQ of the host device 200 so as to execute or perform one corresponding processing/operation (in a fourth step S4 of the command execution flow). For example, in response to the user requirements and/or the different operations of SSD 100, the flash memory controller 110 (or processor 1102) can takes the value recorded in the SQ tail doorbell register as a starting point and reversely fetch ID information of multiple commands buffered in the SQ. Alternatively, the SSD 100 (or processor 1102) can randomly fetch ID information of the commands currently buffered in the SQ of host device 200. It should be noted that an SQ entry previously buffering a command will be cleared and become empty again after such command at such SQ entry is fetched by the SSD 100.

After one command is completed or finished (i.e. the corresponding processing/operation has been finished), in a fifth step S5 of the command execution flow, the flash memory controller 110 (or processor 1102) pushes or writes information (e.g. unique information) of finished command(s) into the CQ of the host device 200.

In a sixth step S6 of the command execution flow, the flash memory controller 110 (or processor 1102) is arranged to send an interrupt event/signal to signal the host device 200 of the command(s) has/have been finished.

In a seventh step S7 of command execution flow, the host device 200 (or operating system 210) is arranged to get the completed command from the CQ.

In an eighth step S8 of command execution flow, the host device 200 (or operating system 210) is arranged to write a doorbell pointer to the SSD 100 to release the CQ entry and is arranged to write a CQ head doorbell pointer to the SSD 100. For example, the host device 200 (or operating system 210) is arranged to update the CQ head pointer which is used to indicate the head information of the command(s) in the CQ, i.e. which entry of the CQ a head of finished command(s) is at. For example, the CQ head doorbell pointer can be implemented by using a CQ head doorbell register that is disposed in and comprised by the register unit 1101 of the SSD 100. That is, the host device 200 (or operating system 210) in this situation for example writes the information of the n-th entry into the CQ head doorbell register of the register unit 1101 via the PCIe bus to update the value previously recorded by the CQ head doorbell register. Thus, the flash memory controller 110 (or processor 1102) of SSD 100 can obtain the value recorded in the CQ head doorbell register to know the head information of command(s) buffered in the CQ of host device 200.

In the default mode, the SSD 100 may be arranged to send an interrupt event to the host device 200 each time when one command is finished. In addition to the default mode, in this embodiment, to improve the performance, the SSD 100 further comprises the above-mentioned specific processing mode in which the flash memory controller 110 (or processor 1102) of SSD 100 is arranged to count an outstanding command number (i.e. the number of unfinished command(s)) in at least one submission queue and to count a completion command number (i.e. the number of finished command(s)) in at least one completion queue each time after an interrupt signal is sent from the SSD 100 to the host device 200 so as to determine whether to and when to send a next interrupt event/signal to the host device 200. By doing so, compared to the conventional method, the total number of sending interrupt event(s) can be significantly reduced for the same number of commands generated by the host device 200. The whole throughput can be improved since it is unnecessary for the host device 200 to frequently execute an interrupt service.

It should be noted that the operations of counting the number of unfinished command(s) and/or counting the number of finished command(s) may be started each time in response to at least one of a first event that the flash memory controller 110 (or processor 1102) finishes command(s) and a second event that the host device 200 generates command (s) after a previous interrupt event/signal is generated and outputted. That is, the operations of counting the number of unfinished command(s) and/or counting the number of finished command(s) are performed during a specific time interval between two interrupt events, i.e. the previous interrupt event and a next interrupt event.

In one embodiment, the flash memory controller 110 (or processor 1102) of SSD 100 compares the outstanding command number with the completion command number to determine whether to and when to generate and send the next interrupt event/signal. For example, the flash memory controller 110 (or processor 1102) counts a total outstanding command number and a total completion command number, and then compares the two numbers to obtain a comparison result. If the comparison result matches a specific condition (e.g. the comparison result indicates that the total completion command number is equal to or larger than the total outstanding command number), the flash memory controller 110 (or processor 1102) is arranged to send an interrupt event/signal (i.e. a next interrupt event/signal) into the host device 200. Such next interrupt event is not sent if the total completion command number is smaller than the total outstanding command number. Thus, in the specific processing mode, the SSD 100 does not send an interrupt event to the host device 200 each time when one command is finished, and it may be arranged to send an interrupt event only when the total completion command number is equal to or larger than the total outstanding command number.

In other embodiments, the flash memory controller 110 (or processor 1102) of SSD 100 compares the outstanding command number with the completion command number based on a specific ratio threshold, which can be predetermined, adjustable, or dynamically adjusted, to determine whether to and when to generate and send the next interrupt event/signal. For example, the flash memory controller 110 (or processor 1102) also counts the total outstanding command number and the total completion command number, and calculates a ratio of the total outstanding command number compared to the total completion command number, e.g.

$$\frac{CCN}{OCN}$$

(but not limited), wherein OCN means the outstanding command number and CCN means the completion command number. Then, the flash memory controller 110 (or processor 1102) compares the calculated ratio with the specific ratio threshold to generate and obtain a comparison result. Only when the comparison result indicates that the calculated ratio is equal to or larger than the specific ratio threshold such as 0.3 (but not limited), the flash memory controller 110 (or processor 1102) is arranged to send the next interrupt event/signal. Thus, in the specific processing mode, the SSD 100 does not send an interrupt event to the host device 200 each time when one command is finished, and it may be arranged to send an interrupt event when the number of completion commands compared to the number of outstanding commands becomes larger than the specific ratio threshold.

Figure 3:
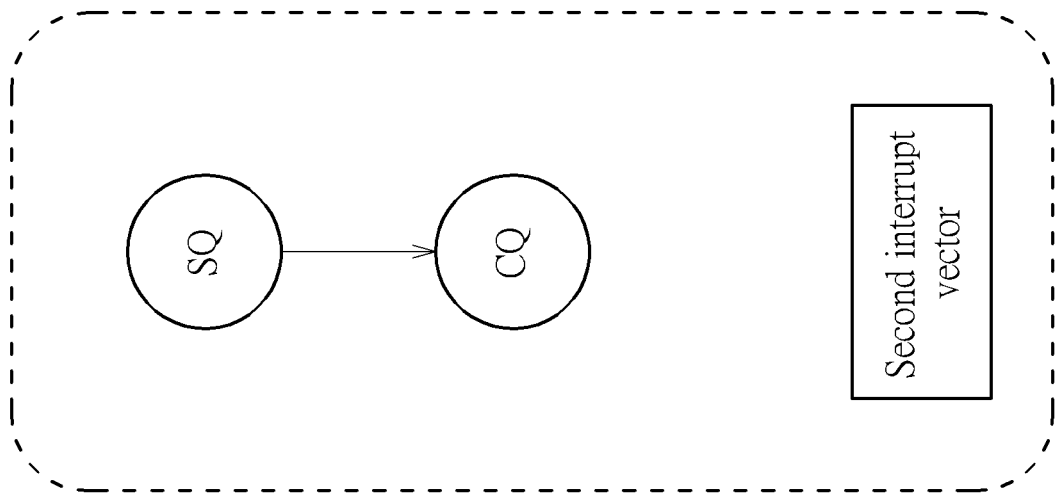
FIG. 3 is a diagram showing the mapping examples of submission queue(s), completion queue(s), and the different interrupt vectors corresponding to the different interrupt events according to an embodiment of the invention.
Figure 3:
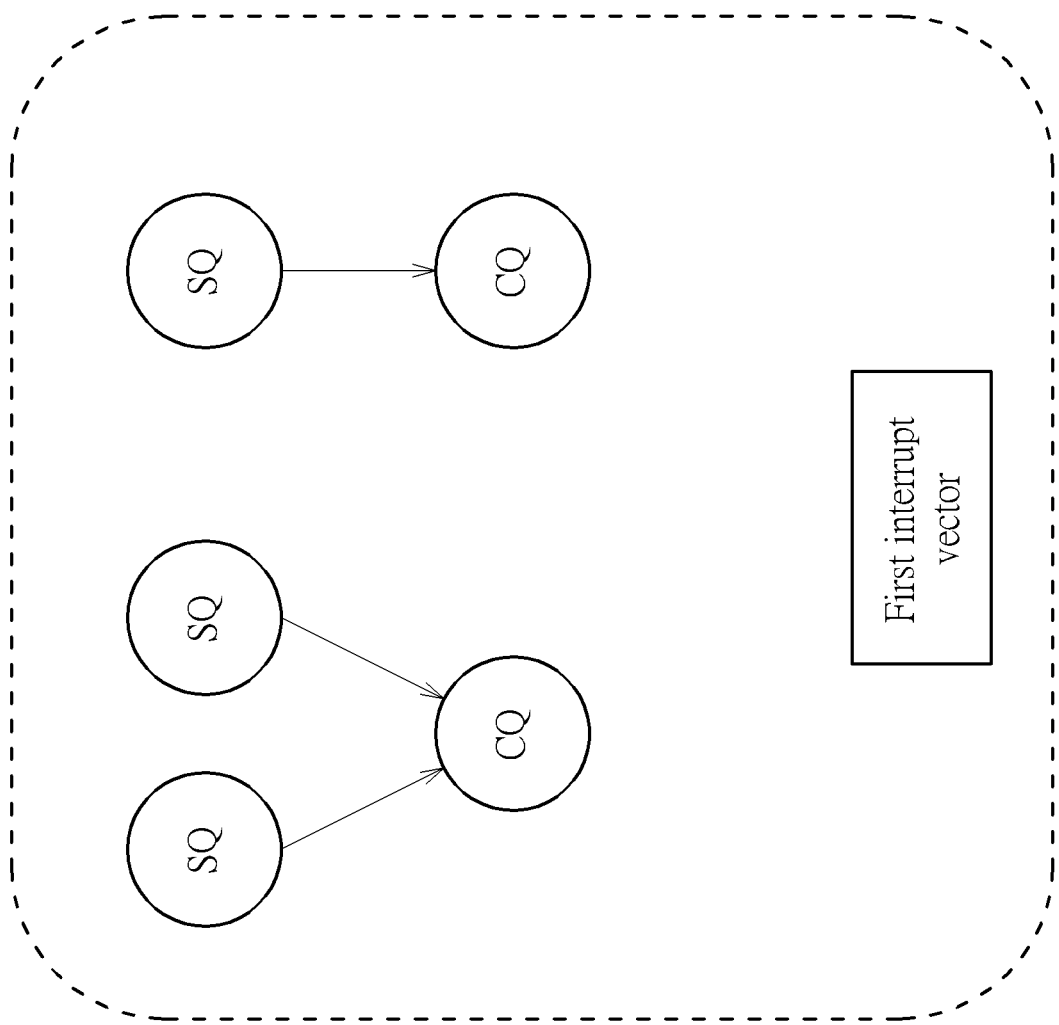

The above-mentioned method can be applied into the different mapping examples of submission queue(s), completion queue(s), and interrupt vectors. FIG. 3 is a diagram showing the mapping examples of submission queue(s), completion queue(s), and the different interrupt vectors corresponding to the different interrupt events according to an embodiment of the invention. As shown in FIG. 3, the host device 200 may comprise multiple completion queues CQ, multiple submission queues SQ, and different interrupt vectors. For example (but not limited), one SQ may be mapped to one CQ, i.e. one-to-one mapping/correspondence relation, and in this situation information of one or more unfinished commands stored in the SQ will be updated and inserted into such CQ after the one or more unfinished commands have been finished by the SSD 100. In other example, more submission queues SQ may be mapped to only one CQ, i.e. many-to-one mapping/correspondence relation, and in this situation information of one or more unfinished commands stored in the submission queues will be updated and inserted into the same CQ after the one or more unfinished commands have been finished by the SSD 100. In FIG. 3, for the first interrupt event associated with the first interrupt vector, the first interrupt vector is associated with the three submission queues and two completion queues wherein two submission queues are mapped to one completion queue while another one submission queue is mapped to another completion queue. For the second interrupt event associated with the second interrupt vector, the second interrupt vector is associated with one submission queue and one completion queue, i.e. on-to-one mapping/correspondence relation.

Figure 4:
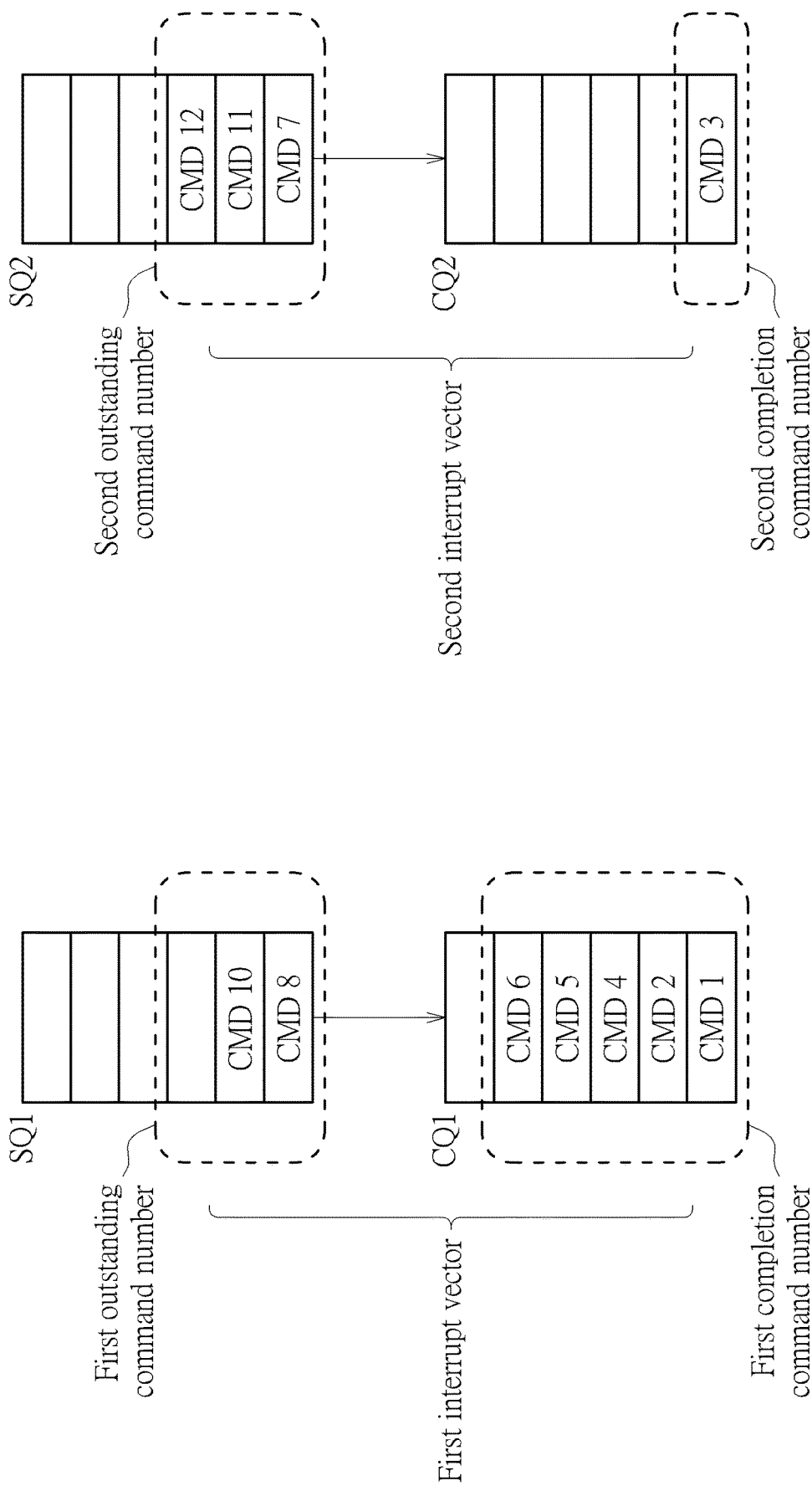
FIG. 4 is a diagram of an example of the submission queues and completion queues according to an embodiment of the invention.

It should be noted that the host device 200 is arranged to send the above-mentioned mapping/correspondence information into the SSD 100 so that the SSD 100 can determine whether to and when to send an interrupt event based on such mapping/correspondence information. FIG. 4 is a diagram of an example of the submission queues and completion queues according to an embodiment of the invention. In FIG. 4, the host device 200 for example comprises two submission queues SQ1 and SQ2 and two completion queues CQ1 and CQ2, wherein the submission queue SQ1 and completion queue CQ1 have one-to-one mapping/correspondence relation which is associated with a first interrupt vector while the submission queue SQ2 and completion queue CQ2 have another one-to-one mapping/correspondence relation which is associated with another different interrupt vector such as a second interrupt vector. For example, information of unfinished commands CMD8 and CMD10 in the SQ1 will be updated into the CQ1 rather than CQ2 after the commands CMD8 and CMD10 have been finished; similarly, information of unfinished command CMD7, CMD11, and CMD12 in the SQ2 will be updated into the CQ2 rather than CQ1 after the commands CMD7, CMD11, and CMD12 have been finished.

In this example, the flash memory controller 110 (or processor 1102) is arranged to respectively and individually calculate a first outstanding command number (e.g. the two unfinished commands CMD8 and CMD10) and a first completion command number (e.g. the five finished commands CMD1, CMD2, CMD4, CMD5, and CMD6) for the first interrupt vector and calculate a second outstanding command number (e.g. the three unfinished commands CMD7, CMD11, and CMD12) and a second completion command number (e.g. the finished command CMD3) for the second interrupt vector. The flash memory controller 110 (or processor 1102) calculates a first ratio (e.g. 5/2=2.5) based on the first outstanding command number (e.g. 2) and the first completion command number (e.g. 5), and calculates a second ratio (e.g. ⅓≅0.33) based on the second outstanding command number (e.g. 3) and the second completion command number (e.g. 1). The flash memory controller 110 (or processor 1102) respectively compares the first ratio with a first ratio threshold (e.g. 1) and compares the second ratio with a second ratio threshold (e.g. 1); in other embodiment, the second ratio threshold can be different from the first ratio threshold.

In this example, the first ratio (e.g. 2.5) is larger than the first ratio threshold (e.g. 1) while the second ratio (e.g. 0.33) is not larger than the second ratio threshold (e.g. 1), then the flash memory controller 110 (or processor 1102) is arranged to send only the first interrupt event (associated with the first interrupt vector) to the host device 200 and does not send the second interrupt event associated with the second interrupt vector. Thus, the host device 200 (or operating system 210) in this situation updates the queues CQ1 and SQ1 rather than the queues CQ2 and SQ2. Alternatively, if the second ratio becomes larger than the second ratio threshold while the first ratio becomes not larger than the first ratio threshold, then the flash memory controller 110 (or processor 1102) sends only the second interrupt event (associated with the second interrupt vector) to the host device 200 without sending the first interrupt event, so that the host device 200 (or operating system 210) updates only the queues CQ2 and SQ2. Alternatively, in other embodiment, if the first ratio is larger than the first ratio threshold and the second ratio is also larger than the second ratio threshold, then the flash memory controller 110 (or processor 1102) may send both the first and second interrupt events, and the host device 200 (or operating system 210) updates the queues SQ1, CQ1, SQ2, and CQ2.

Figure 5:
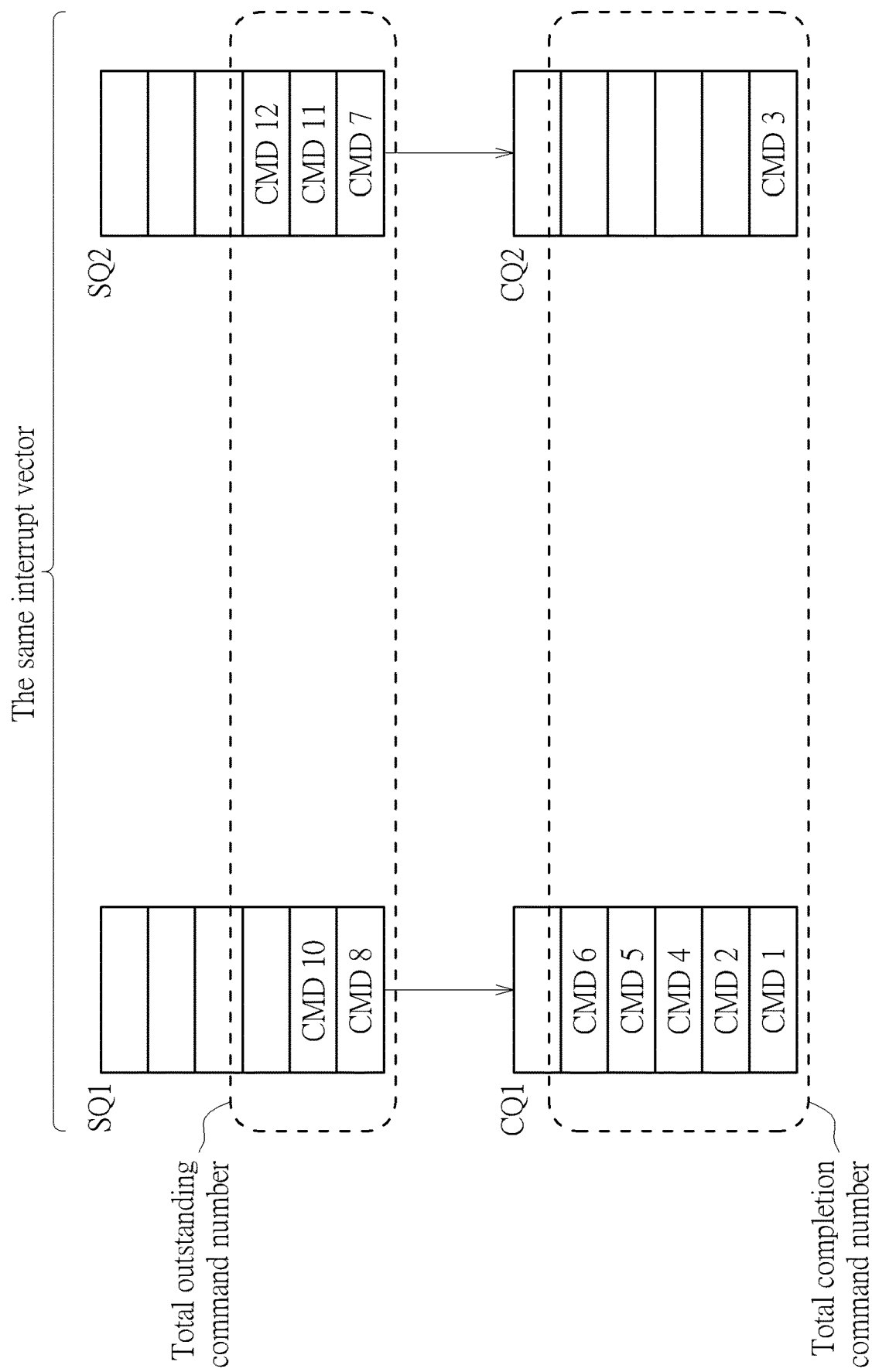
FIG. 5 is a diagram of an example of the submission queues and completion queues according to another embodiment of the invention.

In other embodiments, the above queues SQ1, CQ1, SQ2, and CQ2 may be associated with the same interrupt vector. FIG. 5 is a diagram of an example of the submission queues and completion queues according to another embodiment of the invention. In FIG. 5, the submission queue SQ1 and completion queue CQ1 have one-to-one mapping/correspondence relation which is associated with an interrupt vector while the submission queue SQ2 and completion queue CQ2 have another one-to-one mapping/correspondence relation which is associated with such identical interrupt vector. In this example, for the same interrupt vector, the flash memory controller 110 (or processor 1102) is arranged to calculate the outstanding command number (i.e. the number 5 of total unfinished commands CMD8, CMD10, CMD7, CMD11, and CMD12) corresponding to the interrupt vector and calculate the completion command number (i.e. the number 6 of total finished commands CMD 1, CMD2, CMD4, CMD5, CMD6, and CMD3) corresponding to the same interrupt vector. For example, the outstanding command number and completion command number, respectively calculated by the flash memory controller 110 (or processor 1102), are equal to 5 and 6, i.e. five unfinished commands in the submission queues SQ1 and SQ2 corresponding to the same interrupt event while six finished commands in the completion queues CQ1 and CQ2 corresponding to the same interrupt vector. In this example (but not limited), the number of finished commands is equal to 6 which is larger than the number of unfinished commands (i.e. 5), and the flash memory controller 110 is arranged to immediately send an interrupt event corresponding to such interrupt vector into the host device 200. Instead, if the number of finished commands is not larger than the number of unfinished commands, then the flash memory controller 110 (or processor 1102) will determine not immediately sending an interrupt event corresponding to such interrupt vector. In other embodiments, the flash memory controller 110 (or processor 1102) can calculate a ratio as 6/5=1.2 and compare the calculated ratio with a ratio threshold (e.g. 1), and it is arranged to send an interrupt event since the calculated ratio is larger than the ratio threshold.

Figure 6:
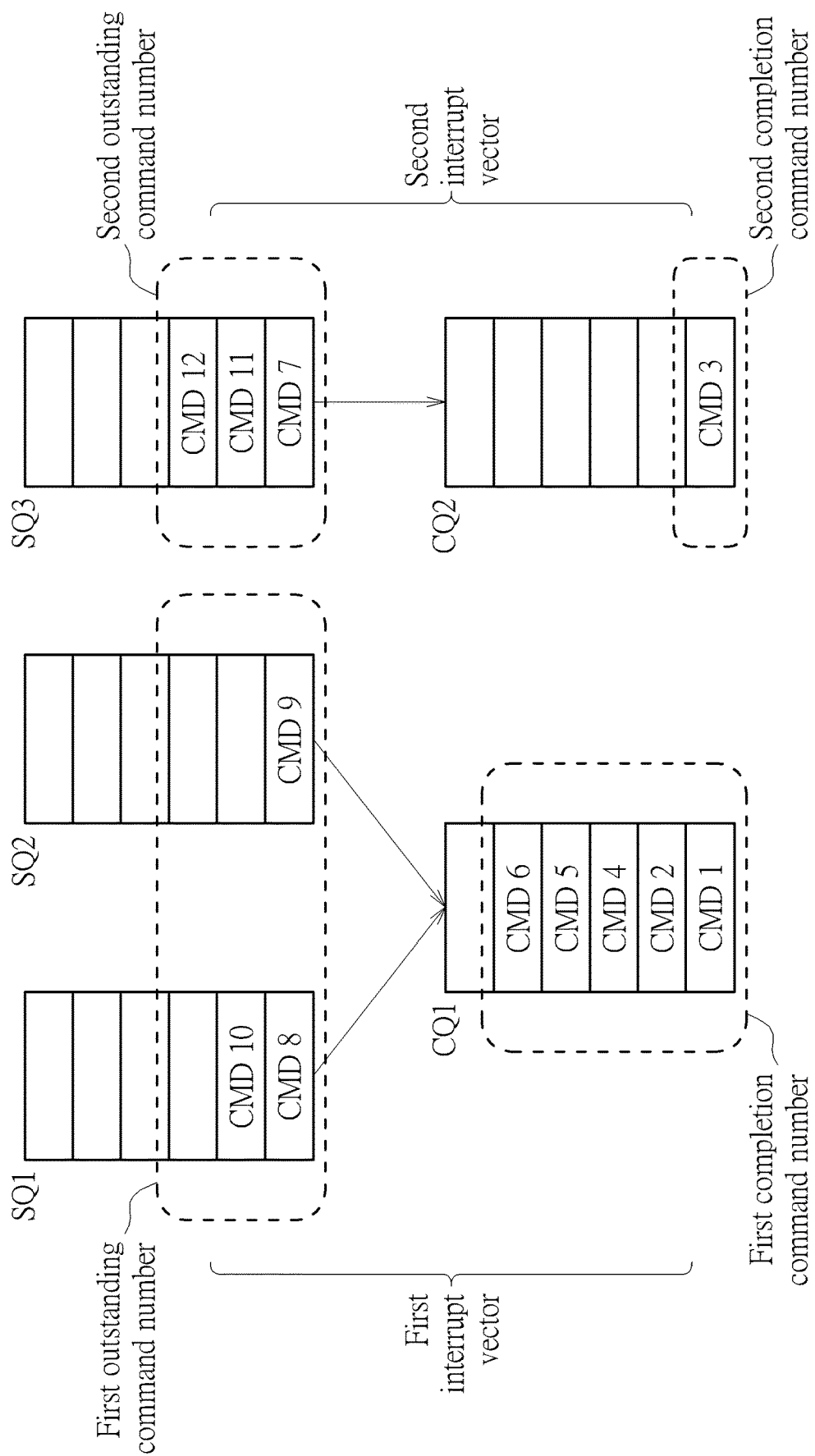
FIG. 6 is a diagram of an example of the submission queues and completion queues according to another embodiment of the invention.

FIG. 6 is a diagram of an example of the submission queues and completion queues according to another embodiment of the invention. In FIG. 6, the host device 200 for example comprises three submission queues SQ1, SQ2, and SQ3 and two completion queues CQ1 and CQ2, wherein the submission queues SQ1 and SQ2 respectively correspond to the completion queue CQ1 (i.e. a many-to-one mapping/correspondence relation which is associated with a first interrupt vector) while the submission queue SQ3 and completion queue CQ2 have an one-to-one mapping/correspondence relation which is associated with a second interrupt vector that is different from the first interrupt vector. For example, information of unfinished commands CMD8 and CMD10 in the SQ1 and information of unfinished command CMD9 in the SQ2 will be updated into the CQ1 rather than CQ2 after the commands CMD8, CMD9, and CMD10 have been finished; similarly, information of unfinished command CMD7, CMD11, and CMD12 in the SQ3 will be updated into the CQ2 rather than CQ1 after the commands CMD7, CMD11, and CMD12 have been finished.

In this example, the flash memory controller 110 (or processor 1102) is arranged to respectively and individually calculate a first outstanding command number (e.g. the three unfinished commands CMD8, CMD10, and CMD9) and a first completion command number (e.g. the five finished commands CMD1, CMD2, CMD4, CMD5, and CMD6) for the first interrupt vector and calculate a second outstanding command number (e.g. the three unfinished commands CMD7, CMD11, and CMD12) and a second completion command number (e.g. the finished command CMD3) for the second interrupt vector. The flash memory controller 110 (or processor 1102) calculates a first ratio (e.g. 5/3≅1.66) based on the first outstanding command number and the first completion command number, and calculates a second ratio (e.g. ⅓≅0.33) based on the second outstanding command number and the second completion command number. The flash memory controller 110 (or processor 1102) respectively compares the first ratio with a first ratio threshold (e.g. 1) and compares the second ratio with a second ratio threshold (e.g. 1); in other embodiment, the second ratio threshold may be different from the first ratio threshold. In this example, the first ratio is larger than the first ratio threshold while the second ratio is not larger than the second ratio threshold, and the flash memory controller 110 (or processor 1102) sends only the first interrupt event (associated with the first interrupt vector) to the host device 200 and does not send the second interrupt event associated with the second interrupt vector, so that the host device 200 (or operating system 210) in this situation updates the queues SQ1, SQ2, and CQ1 rather than the queues CQ2 and SQ3. Alternatively, in other embodiment, if the second ratio is larger than the second ratio threshold while the first ratio is not larger than the first ratio threshold, then the flash memory controller 110 (or processor 1102) sends only the second interrupt event (associated with the second interrupt vector) to the host device 200, to update the queues CQ2 and SQ3. Alternatively, in other embodiment, if the first ratio is larger than the first ratio threshold and the second ratio is larger than the second ratio threshold, then the flash memory controller 110 (or processor 1102) may send both the first and second interrupt events.

Figure 7:
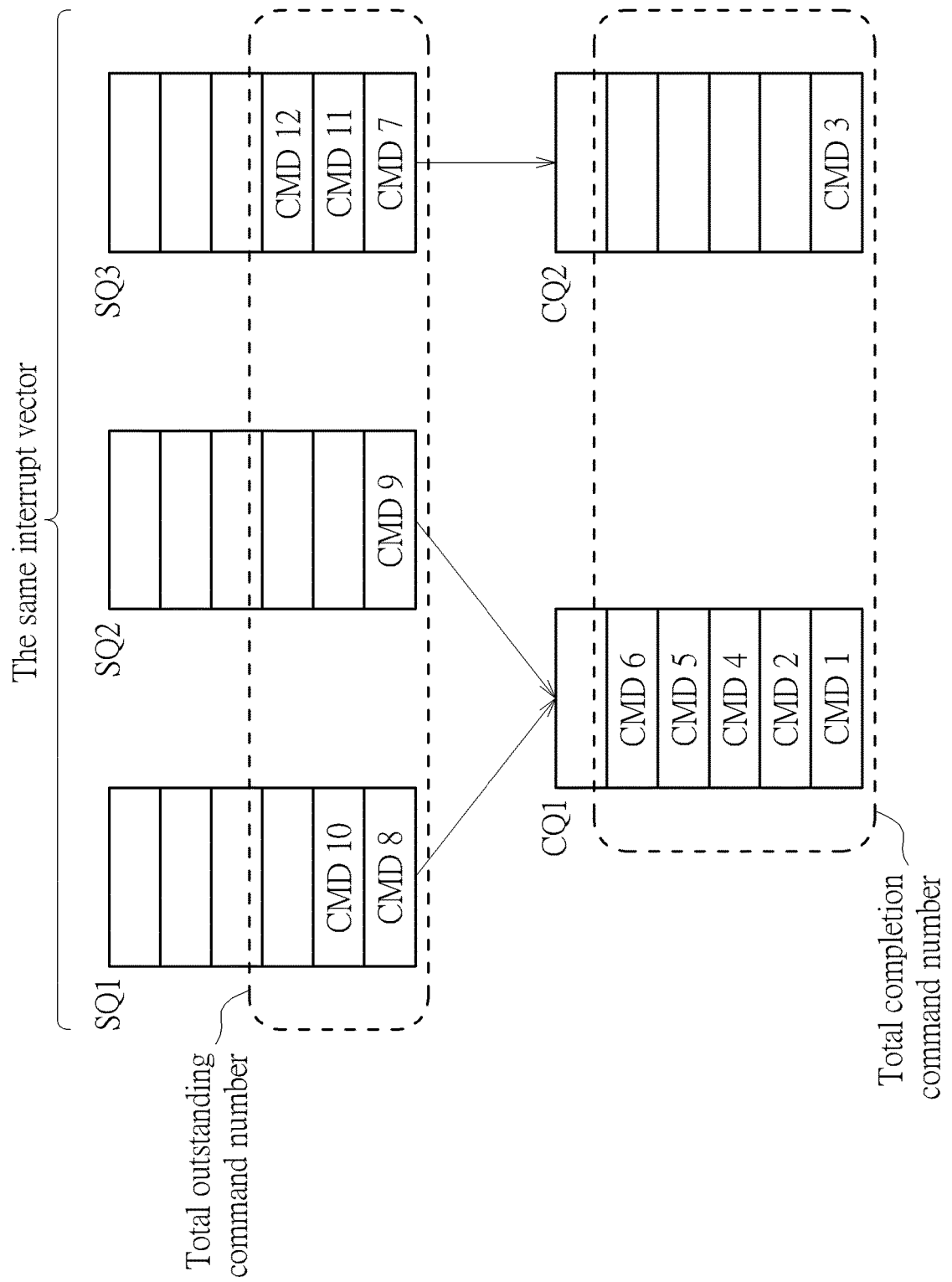
FIG. 7 is a diagram of an example of the submission queues and completion queues according to another embodiment of the invention.

In other embodiments, the above queues in FIG. 6 may be associated with the same interrupt vector. FIG. 7 is a diagram of an example of the submission queues and completion queues according to another embodiment of the invention. In FIG. 7, the submission queue SQ1 and completion queue CQ1 have one-to-one mapping/correspondence relation which is associated with an interrupt vector while the submission queue SQ2 and completion queue CQ2 have another one-to-one mapping/correspondence relation which is associated with such identical interrupt vector. In this example, for the same interrupt vector, the flash memory controller 110 (or processor 1102) is arranged to calculate the outstanding command number (i.e. the number 6 of total unfinished commands) corresponding to the interrupt vector and calculate the completion command number (i.e. the number 6 of total finished commands) corresponding to the same interrupt vector. In this example (but not limited), the number of finished commands is equal to 6 which is equal to the number of unfinished commands (i.e. 6), and the flash memory controller 110 (or processor 1102) is arranged to send an interrupt event corresponding to such interrupt vector into the host device 200; thus, the host device 200 can update the statuses of the all the queues. Instead, in other embodiments, if the number of finished commands is smaller than the number of unfinished commands, then the flash memory controller 110 (or processor 1102) will determine not immediately sending an interrupt event corresponding to such interrupt vector to the host device 200.

Further, in other embodiments, it should be noted that at least one submission queue and/or at least one completion queue may be implemented within the SSD 100; for example (but not limited), a storage space in the flash memory unit 105 can be used as a submission queue and/or a completion queue. The operations are not detailed for brevity.

Further, in other embodiment, the above-mentioned ratio threshold(s) can be dynamically determined further based on the loading condition of the host device 200 and/or the loading condition of SSD 100. The calculated ratio(s) may be finely adjusted based on the loading condition of the host device 200 and/or the loading condition of SSD 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller of a storage device, to be externally coupled to a host device via a specific communication interface, comprising:
   a register unit; and
   a processor, coupled to the register unit, for fetching at least one command generated and outputted by the host device from at least one submission queue of the host device through the specific communication interface to perform at least one corresponding processing operation upon a flash memory chip of the storage device in response to the fetched at least one command, for counting an outstanding command number for the at least one submission queue of the host device which is used for storing information of unfinished commands, counting a completion command number for at least one completion queue of the host device which is used for storing information of finished commands, comparing the counted outstanding command number with the counter completion command number to generate a comparison result, and for generating and outputting an interrupt event from the storage device to the host device through the specific communication interface to signal the host device of the at least one command has been finished when the at least one completion queue is not full and the comparison result of the counted outstanding command number with the counted completion command number indicates that the counted completion command number is not smaller than the counted outstanding command number.

2. The flash memory controller of claim 1, wherein the processor is arranged for:
   counting a first outstanding command number and a first completion command number for at least one first submission queue and at least one first completion queue belonging to a first interrupt vector;
   counting a second outstanding command number and a second completion command number for at least one second submission queue and at least one second completion queue belonging to a second interrupt vector;
   sending a first interrupt event corresponding to the first interrupt vector only when the first completion command number is not smaller than the first outstanding command number; and
   sending a second interrupt event corresponding to the second interrupt vector only when the second completion command number is not smaller than the second outstanding command number.

3. The flash memory controller of claim 1, wherein the processor is arranged for:
   counting a first outstanding command number and a first completion command number for at least one first submission queue and at least one first completion queue belonging to a first interrupt vector;
   counting a second outstanding command number and a second completion command number for at least one second submission queue and at least one second completion queue belonging to a second interrupt vector;
   calculating a first ratio for the first outstanding command number and the first completion command number;
   calculating a second ratio for the second outstanding command number and the second completion command number;
   sending a first interrupt event corresponding to the first interrupt vector only when the first ratio is not smaller than the first ratio threshold; and
   sending a second interrupt event corresponding to the second interrupt vector only when the second ratio is not smaller than the second ratio threshold.

4. The flash memory controller of claim 3, wherein the processor is arranged to dynamically adjust the first ratio threshold or the second ratio threshold according to a loading condition of the host device or a loading condition of the storage device.

5. A storage device, to be externally coupled to a host device via a specific communication interface, comprising:

a flash memory unit comprising at least one flash memory; and a flash memory controller, coupled to the flash memory unit, for fetching at least one command generated and outputted by the host device from at least one submission queue of the host device through the specific communication interface to perform at least one corresponding processing operation upon a flash memory chip of the storage device in response to the fetched at least one command, for counting an outstanding command number for the at least one submission queue of the host device which is used for storing information of unfinished commands, counting a completion command number for the at least one completion queue of the host device which is used for storing information of finished commands, comparing the counted outstanding command number with the counter completion command number to generate a comparison result, and for generating and outputting an interrupt event from the storage device to the host device through the specific communication interface to signal the host device of the at least one command has been finished when the at least one completion queue is not full and the comparison result of the counted outstanding command number with the counted completion command number indicates that the counted completion command number is not smaller than the counted outstanding command number.

6. The storage device of claim 5, wherein the flash memory controller is arranged for:

counting a first outstanding command number and a first completion command number for at least one first submission queue and at least one first completion queue belonging to a first interrupt vector;

counting a second outstanding command number and a second completion command number for at least one second submission queue and at least one second completion queue belonging to a second interrupt vector;

sending a first interrupt event corresponding to the first interrupt vector only when the first completion command number is not smaller than the first outstanding command number; and sending a second interrupt event corresponding to the second interrupt vector only when the second completion command number is not smaller than the second outstanding command number.

7. The storage device of claim 5, wherein the flash memory controller is arranged for:

counting a first outstanding command number and a first completion command number for at least one first submission queue and at least one first completion queue belonging to a first interrupt vector;

counting a second outstanding command number and a second completion command number for at least one second submission queue and at least one second completion queue belonging to a second interrupt vector;

calculating a first ratio for the first outstanding command number and the first completion command number;

calculating a second ratio for the second outstanding command number and the second completion command number;

sending a first interrupt event corresponding to the first interrupt vector only when the first ratio is not smaller than the first ratio threshold; and sending a second interrupt event corresponding to the second interrupt vector only when the second ratio is not smaller than the second ratio threshold.

8. The storage device of claim 7, wherein the flash memory controller is arranged to dynamically adjust the first ratio threshold or the second ratio threshold according to a loading condition of the host device or a loading condition of the storage device.

9. A method of a storage device, to be externally coupled to a host device via a specific communication interface, comprising:

providing a flash memory unit comprising at least one flash memory;

fetching at least one command generated and outputted by the host device from at least one submission queue of the host device through the specific communication interface to perform at least one corresponding processing operation upon a flash memory chip of the storage device in response to the fetched at least one command;

counting an outstanding command number for the at least one submission queue of the host device which is used for storing information of unfinished commands;

counting a completion command number for the at least one completion queue of the host device which is used for storing information of finished commands;

comparing the counted outstanding command number with the counter completion command number to generate a comparison result; and generating and outputting an interrupt event from the storage device to the host device through the specific communication interface to signal the host device of the at least one command has been finished when the at least one completion queue is not full and the comparison result of the counted outstanding command number with the counted completion command number indicates that the counted completion command number is not smaller than the counted outstanding command number.

10. The method of claim 9, further comprising:

counting a first outstanding command number and a first completion command number for at least one first submission queue and at least one first completion queue belonging to a first interrupt vector;

counting a second outstanding command number and a second completion command number for at least one second submission queue and at least one second completion queue belonging to a second interrupt vector;

sending a first interrupt event corresponding to the first interrupt vector only when the first completion command number is not smaller than the first outstanding command number; and sending a second interrupt event corresponding to the second interrupt vector only when the second completion command number is not smaller than the second outstanding command number.

11. The method of claim 9, further comprising:

counting a first outstanding command number and a first completion command number for at least one first submission queue and at least one first completion queue belonging to a first interrupt vector;

counting a second outstanding command number and a second completion command number for at least one second submission queue and at least one second completion queue belonging to a second interrupt vector;

calculating a first ratio for the first outstanding command number and the first completion command number;
calculating a second ratio for the second outstanding command number and the second completion command number;
sending a first interrupt event corresponding to the first interrupt vector only when the first ratio is not smaller than the first ratio threshold; and
sending a second interrupt event corresponding to the second interrupt vector only when the second ratio is not smaller than the second ratio threshold.

12. The method of claim 11, further comprising:
dynamically adjusting the first ratio threshold or the second ratio threshold according to a loading condition of the host device or a loading condition of the storage device.

* * * * *